United States Patent
Iwasaki et al.

(10) Patent No.: US 11,143,100 B2
(45) Date of Patent: Oct. 12, 2021

(54) TENSIONER

(71) Applicant: TSUBAKIMOTO CHAIN CO., Osaka (JP)

(72) Inventors: Yoshitaka Iwasaki, Osaka (JP); Masanori Watanabe, Osaka (JP); Osamu Yoshida, Osaka (JP); Yuji Kurematsu, Osaka (JP); Yuichiro Ishikawa, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 365 days.

(21) Appl. No.: 16/225,139

(22) Filed: Dec. 19, 2018

(65) Prior Publication Data

US 2019/0195123 A1 Jun. 27, 2019

(30) Foreign Application Priority Data

Dec. 22, 2017 (JP) .............................. JP2017-246098
Oct. 23, 2018 (JP) .............................. JP2018-199055

(51) Int. Cl.
*F02B 67/06* (2006.01)
*F16H 7/08* (2006.01)

(52) U.S. Cl.
CPC .......... *F02B 67/06* (2013.01); *F16H 7/0829* (2013.01); *F16H 2007/0806* (2013.01); *F16H 2007/0812* (2013.01); *F16H 2007/0863* (2013.01)

(58) Field of Classification Search
CPC ..... F16H 2007/0812; F16H 2007/0814; F16H 2007/0817

USPC .......................................................... 474/110
See application file for complete search history.

(56) References Cited

U.S. PATENT DOCUMENTS

| | | | | | |
|---|---|---|---|---|---|
| 5,860,881 | A | * | 1/1999 | Tada | F16H 7/0848 474/110 |
| 5,879,256 | A | * | 3/1999 | Tada | F16H 7/08 474/110 |
| 5,935,031 | A | * | 8/1999 | Tada | F16H 7/0848 474/110 |

(Continued)

FOREIGN PATENT DOCUMENTS

| | | |
|---|---|---|
| JP | 2001-012569 A | 1/2001 |
| JP | 2016-035207 A | 3/2016 |

(Continued)

OTHER PUBLICATIONS

Office Action dated Aug. 27, 2020, issued in counterpart KR application No. 10-2018-0159983, with English translation. (13 pages).

*Primary Examiner* — Henry Y Liu
(74) *Attorney, Agent, or Firm* — Westerman, Hattori, Daniels & Adrian, LLP (57) ABSTRACT

To provide a tensioner that has a simple structure and is easy to assemble, and is configured to smoothly relieve pressure during oil release with reduced flow resistance so that the oil pressure in an oil pressure chamber is kept stable in a favorable manner. A relief valve unit includes a cap member that fits with a seat member to retain a stopper member inside the seat member. An external relief hole, which causes a relief-side space in a plunger hole to communicate with the outside of a plunger, opens radially in an outer circumferential surface of the plunger.

11 Claims, 11 Drawing Sheets

(56) References Cited

U.S. PATENT DOCUMENTS

| | | | | |
|---|---|---|---|---|
| 6,193,623 B1* | 2/2001 | Koch | ............... | F16H 7/0836 474/110 |
| 6,322,468 B1* | 11/2001 | Wing | ............... | F16H 7/08 474/109 |
| 6,352,487 B1* | 3/2002 | Tada | ............... | F01L 1/02 474/110 |
| 6,361,458 B1* | 3/2002 | Smith | ............... | F16H 7/0848 474/109 |
| 6,398,682 B1* | 6/2002 | Suzuki | ............... | F16H 7/08 474/110 |
| 6,435,993 B1* | 8/2002 | Tada | ............... | F16H 7/0836 474/109 |
| 7,174,799 B2* | 2/2007 | Yoshida | ............... | F16H 7/0836 474/101 |
| 7,775,923 B2* | 8/2010 | Sato | ............... | F16H 7/0836 474/110 |
| 7,775,924 B2* | 8/2010 | Koch | ............... | F16K 17/0406 474/110 |
| 8,221,274 B2* | 7/2012 | Sato | ............... | F16H 7/0836 474/110 |
| 8,574,106 B2* | 11/2013 | Botez | ............... | F16H 7/0848 474/110 |
| 10,260,603 B2* | 4/2019 | Kurematsu | ............... | F16H 7/0848 |
| 10,443,691 B2* | 10/2019 | Fischer | ............... | F16K 17/0413 |
| 10,753,435 B2* | 8/2020 | Freemantle | ............... | F16H 7/0848 |
| 2003/0216202 A1* | 11/2003 | Emizu | ............... | F16H 7/0836 474/109 |
| 2006/0003859 A1* | 1/2006 | Sato | ............... | F16H 7/0836 474/110 |
| 2006/0094549 A1* | 5/2006 | Yoshida | ............... | F16H 7/0836 474/110 |
| 2010/0004080 A1* | 1/2010 | He | ............... | F16K 17/10 474/110 |
| 2013/0017913 A1* | 1/2013 | Hartmann | ............... | F16H 7/0848 474/110 |
| 2016/0327135 A1* | 11/2016 | Fischer | ............... | F16H 7/0836 |
| 2017/0037939 A1* | 2/2017 | Kunimatsu | ............... | F16H 7/0836 |
| 2017/0130807 A1* | 5/2017 | Kurematsu | ............... | F16H 7/0848 |
| 2017/0227135 A1* | 8/2017 | Crump | ............... | F16H 7/08 |
| 2017/0356528 A1* | 12/2017 | Fischer | ............... | F16H 7/08 |
| 2017/0363181 A1* | 12/2017 | Freemantle | ............... | F16H 7/0848 |
| 2017/0370447 A1* | 12/2017 | Freemantle | ............... | F16H 7/0848 |
| 2018/0259077 A1* | 9/2018 | Shinoyama | ............... | F16K 17/0406 |
| 2019/0120343 A1* | 4/2019 | Watanabe | ............... | F16H 7/0836 |
| 2019/0128389 A1* | 5/2019 | Ullein | ............... | F16H 7/0834 |

FOREIGN PATENT DOCUMENTS

| | | |
|---|---|---|
| JP | 2017-25980 A | 2/2017 |
| KR | 10-2003-0078759 A | 10/2003 |
| KR | 10-2017-0102890 A | 9/2017 |
| WO | 2016/109165 A1 | 7/2016 |

* cited by examiner

Related Art

Related Art

FIG. 20

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension of a chain or the like. For example, a chain guide mechanism has been known, which slidably guides, by means of a tensioner lever, a drive chain such as an endless roller chain passing over respective sprockets of a crankshaft and a cam shaft inside an engine room, and which uses a tensioner to bias the tensioner lever in order to maintain appropriate tension of the chain or the like.

Figure 18:
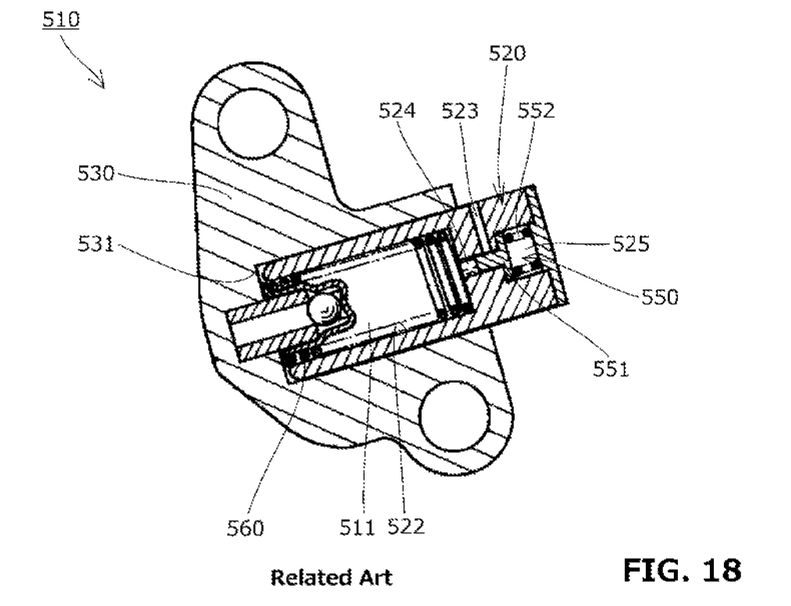
FIG. 18 is a cross-sectional view illustrating a conventional tensioner.

One known tensioner 510 used in such a chain guide mechanism includes, as shown in FIG. 18, a plunger 520 having a plunger hole 522 that is open on the rear side, a housing 530 having a plunger bore 531 that is open on the front side for accommodating the plunger 520, a relief valve mechanism 550 that releases oil in an oil pressure chamber 511 to the outside of the plunger 520 when oil pressure in the oil pressure chamber 511 builds up, and a main spring 560 that is accommodated in the oil pressure chamber 511 formed between the plunger 520 and the plunger bore 531 such as to freely expand and contract, and that biases the plunger 520 toward the front side (see, for example, Japanese Patent Application Laid-open No. 2001-12569).

In this tensioner 510 described in Japanese Patent Application Laid-open No. 2001-12569, a pressure passage 524 in communication with the oil pressure chamber 511, a discharge hole 523 that connects the pressure passage 524 with the outside of the plunger 520, and a spring accommodating space 525 formed on the front side of the pressure passage 524, are formed at the bottom of the plunger 520. The relief valve mechanism 550 is made up of a valve member 551 slidably fitted in the pressure passage 524, and a relief spring 552 set inside the spring accommodating space 525 to bias the valve member 551 toward the oil pressure chamber 511.

In this tensioner 510, when the oil pressure in the oil pressure chamber 511 rises, the valve member 551 moves forward against the biasing force of the relief spring 552 so that the pressure passage 524 communicates with the discharge hole 523 and the oil is released from the discharge hole 523.

One problem with such tensioner 510 was that the plunger 520 has a complex structure, because of which high machining precision was required, and assembling was complex.

To simplify the structure of the plunger and to make assembling easy, another known tensioner has relief valve components integrated into a unit and inserted in the plunger. The plunger is provided with an external relief hole for discharging released oil to the outside (see, WO 2016/109165, for example).

Figure 19:
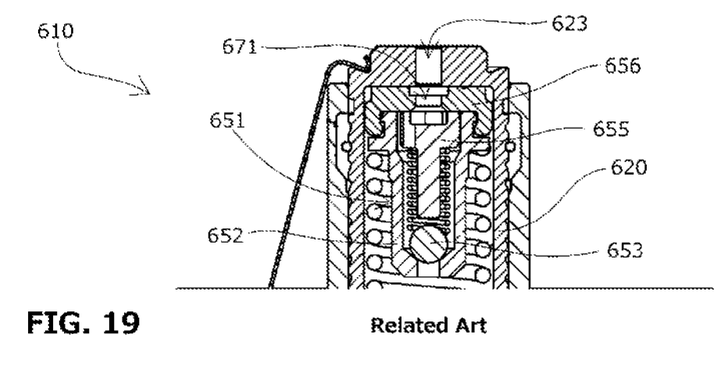
FIG. 19 is a cross-sectional view illustrating another conventional tensioner.

In this tensioner 610 described in WO 2016/109165, as shown in FIG. 19 (or in part of FIG. 1 in WO 2016/1091655, a relief valve unit 651 (48) is inserted on the front side of a plunger 620 (16). An oil leak part 671 provided to a cap member 656 of the relief valve unit 651 (48) is directly connected to an external relief hole 623 (16b) opened on the front side of the plunger 620 (16) so that released oil is discharged out of the plunger 620 (16) from the front.

SUMMARY OF THE INVENTION

In the tensioner 610 described in WO 2016/109165, the external relief hole 623 (16b) opened on the front side of the plunger 620 (16) is positioned on the center axis, and the oil leak part 671 directly connected thereto is also positioned an the center axis.

A stopper member 655 that restricts the range of movement of a valve ball 653 (48) is also provided on the center axis. Therefore, to discharge the oil that is released when the valve ball 653 (48) separates from a seat member 652 from the external relief hole 623 (16b), the stopper member 655 needs to have an oil path that directs oil from its sides toward the center.

The stopper member 655 therefore has a complex shape on the side facing the cap member 656 for allowing oil to pass from side faces toward the center. The flow resistance was accordingly large, because of which pressure relief during oil release could be inhibited.

Another problem was that the external relief hole 623 (16b) is opened on the front side of the plunger 620 (16), so that a pressing surface of a guide lever or the like that is pushed by the plunger 620 (16) directly contacts the external relief hole 623 (16b). This further increases the flow resistance and could inhibit smooth pressure relief during oil release.

Accordingly, an object of the present invention is to solve these problems and provide a tensioner that has a simple structure and is easy to assemble, and is configured to smoothly relieve pressure during oil release with reduced flow resistance so that the oil pressure in an oil pressure chamber is kept stable in a favorable manner.

The present invention solves the problems described above by providing a tensioner including a plunger having a plunger hole that is open on a rear side, a housing having a plunger bore that is open on a front side and accommodates the plunger, main biasing means that is accommodated inside an oil pressure chamber formed between the plunger and the plunger bore such as to freely expand and contract, and that biases the plunger toward the front side, and a relief valve mechanism that releases oil inside the oil pressure chamber out of the plunger when oil pressure in the oil pressure chamber rises. The relief valve mechanism includes a relief valve unit inserted into the plunger hole on a front side thereof, and an external relief hole that causes a relief-side space of the relief valve unit in the plunger hole to communicate with outside of the plunger. The relief valve unit includes a seat member, a valve ball housed in the seat member, a spring biasing the valve ball, a stopper member holding the spring and restricting a movement range of the valve ball, and a cap member fitted with the seat member and retaining the stopper member inside the seat member. The external relief hole is opened radially in an outer circumferential surface of the plunger.

According to the present invention set forth in claim 1, when the oil pressure in the oil pressure chamber rises, the valve member is moved away from the oil pressure chamber by the rising oil pressure, so that the oil can be released from the oil pressure chamber into the relief space through between the valve member and a partition part. Moreover, the following effects can be achieved.

According to the present invention set forth in claim 1, the cap member has an oil leak part that discharges released oil to the relief-side space. The external relief hole of the plunger is opened radially in an outer circumferential surface of the plunger. Therefore, the oil leak part only needs to be in communication with the space that connects to the external relief hole of the plunger and need not be provided on the center axis.

This obviates the need to form an oil path for directing released oil toward the center, and enables simplification of the structure of the stopper member. Thus the tensioner structure is simplified and assembling is facilitated. Also, the flow resistance is reduced so that pressure is smoothly relieved during oil release.

Moreover, since the external relief hole of the plunger is opened radially in an outer circumferential surface of the plunger and there is no blocking component such as a guide lever in front of the external relief hole, the flow resistance of the oil discharge path can be reduced.

According to the configuration set forth in claim 2, the oil leak part has a lateral open part that discharges released oil directly in the radial direction. Thus, there need not be a space on the front side connected to the external relief hole of the plunger. Also, the flow resistance is reduced so that pressure is smoothly relieved during oil release.

The plunger can have a smaller distal end plate thickness, and thus can be made more lightweight, or have a longer spring space, or have a shorter overall length.

According to the configuration set forth in claim 3, the oil leak part includes a connected portion circumferentially transecting in a middle part of the lateral open part. This way, the oil leak part can have separate functions on the upper side and lower side, respectively, for letting oil escape laterally and for serving as a slit for allowing deflection of the cap member when the cap member is fitted to the seat member.

Therefore, despite the oil leak part having an increased circumferential width, the retention force when the cap member is fitted can be enhanced, so that the cap member can be prevented from coming off when subjected to a large impact.

According to the configuration set forth in claim 4, the top open part is formed wider in a circumferential direction than a portion of the lateral open part above the connected portion. This allows the top open part to be positioned on radially outer side, which ensures there is a sufficient flow path area for the released oil flowing toward the top side to enable smooth oil escape, as well as allows the top open part to have an optimal hole shape that provides a sufficient pressure-receiving area for receiving the stopper member.

According to the configuration set forth in claim 5, the cap member includes a flow adjusting protrusion on an outer circumferential surface between the oil leak parts. This controls the flow of released oil in the outer circumferential direction, prevents turbulence, and enables smooth oil escape, as well as improves the guiding feature when the relief valve unit is inserted into the plunger, which facilitates assembly.

According to the configuration set forth in claim 6, the cap member includes an engagement protrusion that keeps the cap member fitted with the seat member, while the seat member includes an engagement recess that mates with the engagement protrusion to keep the cap member fitted with the seat member. The relief valve unit can be assembled first before being inserted into the plunger hole, whereby assembling of the tensioner is made easy.

According to the configuration set forth in claim 7, the engagement recess is provided at a plurality of positions along a direction in which the plunger moves out, such as to be able to hold the cap member. The relief valve unit can be assembled first by lightly fitting the cap member with the seat member without largely compressing the strong valve spring, and after that, the relief valve unit can be inserted into the plunger hole where the cap member can be fitted with the seat member more tightly. Thus assembling of the tensioner is made easy.

One of the engagement recesses on the protruding end side to mate with the cap member lightly may have a larger depth than the other engagement recess for a deeper press fit. This way, when the relief valve unit is inserted into the plunger hole, it can be smoothly pushed in deep, as the outer diameter of the cap member is reduced because of the larger depth of the engagement recess. When the engagement protrusion on the cap member fits in the engagement recess in the deeper position, the outer diameter of the cap member becomes larger because the engagement recess is shallower so that the relief valve unit can be maintained with a light press fit inside the plunger hole.

According to the configuration set forth in claim 8, the cap member includes an outer surface protrusion that abuts on an inner wall of the plunger hole when housed inside the plunger. The protrusion prevents the cap member and the seat member from separating from each other inside the plunger even if the engagement recess of the seat member and the engagement protrusion of the cap member are configured to make a shallow fit. Therefore, the engagement recess of the seat member and the engagement protrusion of the cap member can be engaged with each other easily during the assembly.

Since the relief valve unit is configured such that it is fixed inside the plunger with a light press fit by the outer surface protrusion, and provided with a plurality of circumferentially intermittently formed outer surface protrusions, air bleeding performance of the oil pressure chamber at the start-up is improved.

According to the configuration set forth in claim 9, the outer surface protrusion of the cap member is formed in a shape that keeps the relief valve unit with a light press fit when the relief valve unit is inserted into the plunger hole. Since the relief valve unit is maintained inside the plunger hole, it is prevented from dropping during the assembling work of other components, so that the assembling of the entire tensioner is made easy.

According to the configuration set forth in claim 10, the cap member includes a holding recess that fits with the stopper member. Thus a lateral oil path is reliably provided on the stopper member for the released oil so that pressure is relieved smoothly during oil release with reduced flow resistance.

Also, the cap member and the stopper member can be fitted with each other when assembled, which makes the assembling of the relief valve unit easier.

According to the configuration set forth in claim 11, the cap member is integrally formed with the stopper member as a single member. The number of components is thus reduced, so that the assembling of the relief valve unit is made even easier.

According to the configuration set forth in claim 12, the cap member is made of a resin material, which allows for a higher degree of freedom in shape, enables a weight reduction, and further facilitates assembling of the relief valve unit. It also allows designing of an optimal oil path, and smooth pressure relief can be achieved during oil release with reduced flow resistance.

Moreover, the force applied to the plunger when the relief valve unit is pressed into the plunger hole is reduced so that plunger deformation is prevented and the plunger can be made thinner to be more lightweight, and can have a higher shape accuracy.

DESCRIPTION OF THE PREFERRED EMBODIMENTS

A tensioner according to a first embodiment of the present invention will be described below with reference to the drawings.

Figure 20:
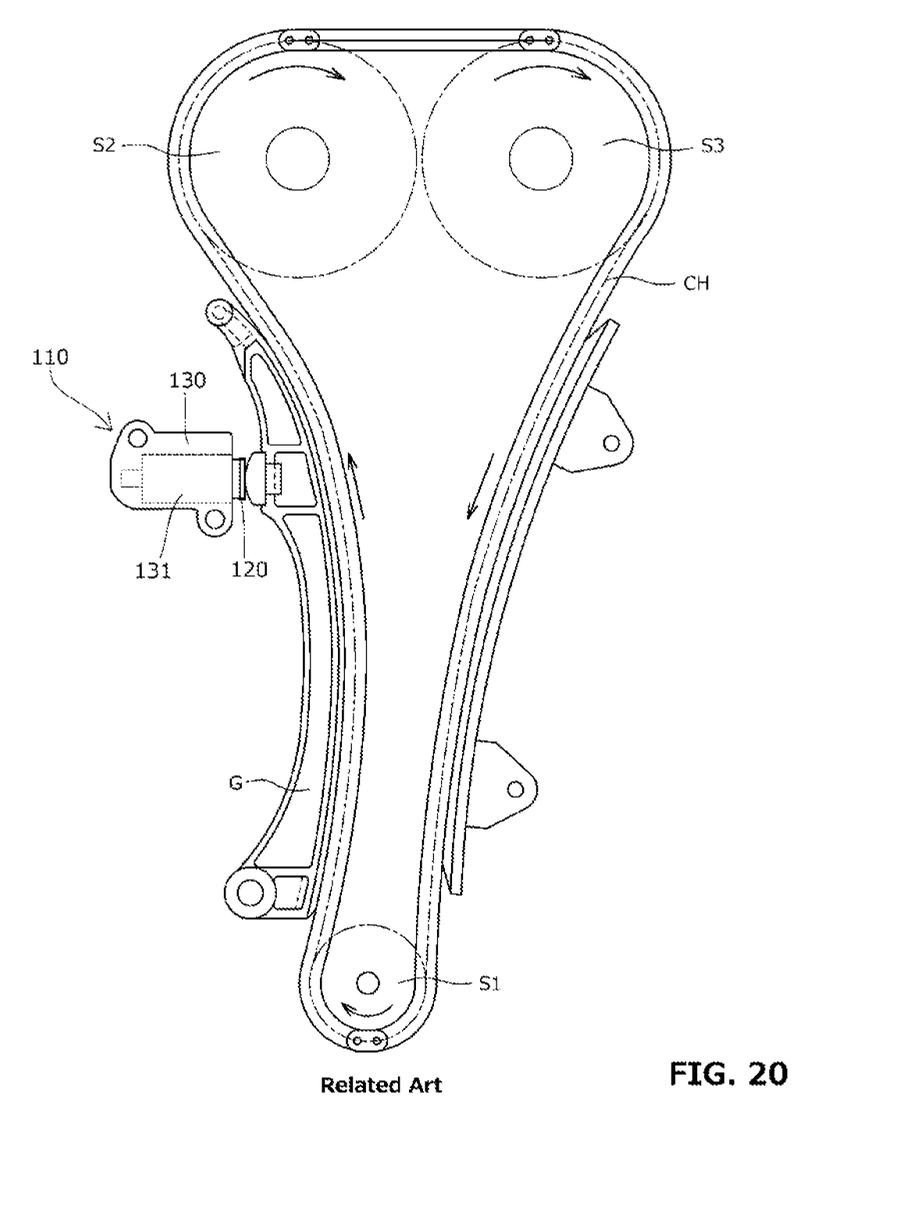
FIG. 20 is an illustrative diagram showing a timing system in which the tensioner is incorporated.

First, the tensioner 110 is incorporated in a chain transmission used in a timing system or the like of a car engine. As shown in FIG. 20, the tensioner is attached to an engine block (not shown) to apply appropriate tension to the slack side of a drive chain CH passing over a plurality of sprockets S1 to S3 via a tensioner lever G to reduce vibration during the drive.

Figure 1:
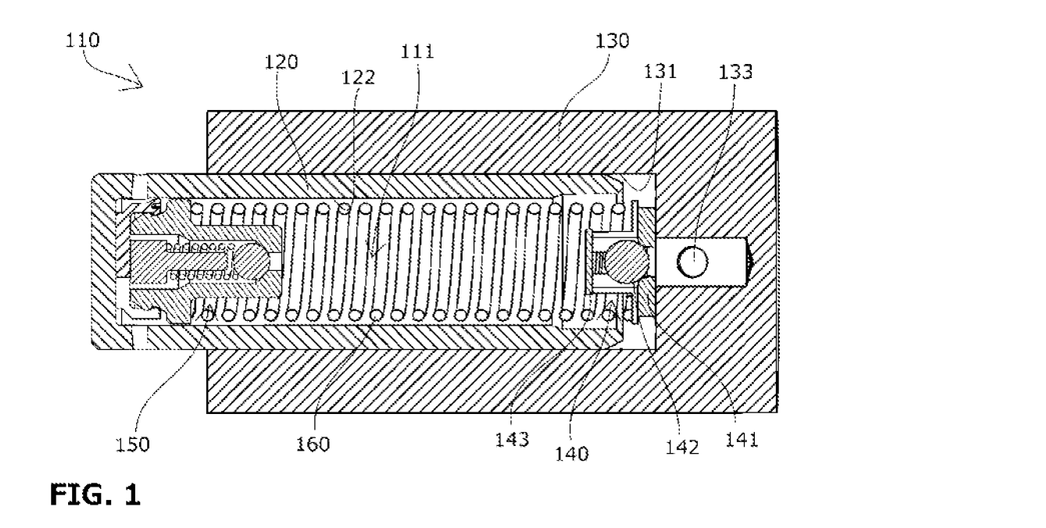
FIG. 1 is a cross-sectional view of a tensioner according to a first embodiment of the present invention.

The tensioner 110 includes, as shown in FIG. 1, a plunger 120 having a plunger hole 122 that is open on a rear side, a housing 130 having a plunger bore 131 that is open on a front side for accommodating the plunger 120, a check valve 140 disposed on the bottom side of the housing 130, a relief valve mechanism 150 that releases oil from the oil pressure chamber 111 out of the plunger 120 when the oil pressure inside the oil pressure chamber 111 rises, and a main spring (main biasing means) 160 that is accommodated inside the oil pressure chamber 111 formed between the plunger 120 and the plunger bore 131 such as to freely expand and contract, and that biases the plunger 120 toward the front side.

The check valve 140 allows the oil to flow into the oil pressure chamber 111 from the outside through the oil supply hole 133, and stops the oil from flowing out from the oil supply hole 133. The check valve is made up of a ball seat 141 disposed in tight contact with the bottom of the plunger bore 131, a spherical check ball 142 that can be seated on the ball seat 141 in tight contact therewith, and a retainer 143 arranged on the front side of the check ball 142 to restrict the movement of the check ball 142.

A ball spring that biases the check ball 142 toward the ball seat 141 may be disposed between the check ball 142 and the retainer 143.

Figure 2:
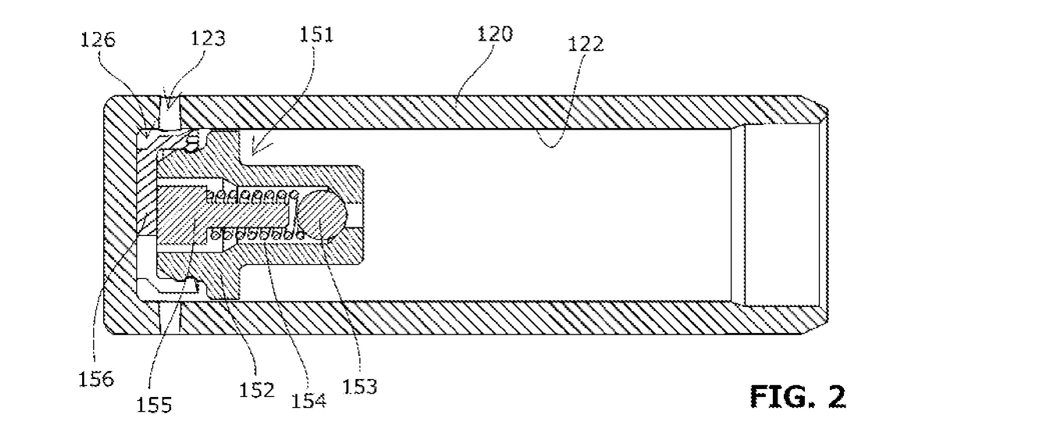
FIG. 2 is a cross-sectional view of a plunger of the tensioner according to the first embodiment of the present invention.

The plunger 120 of the tensioner 110 according to the first embodiment includes a relief valve mechanism, as shown in FIG. 2, made up of a relief valve unit 151 inserted on the front side of the plunger hole 122, and an external relief hole 123 that causes a relief-side space 126 of the relief valve unit 151 to communicate with the outside of the plunger 120.

The external relief hole 123 opens radially in an outer circumferential surface of the plunger 120.

Figure 3:
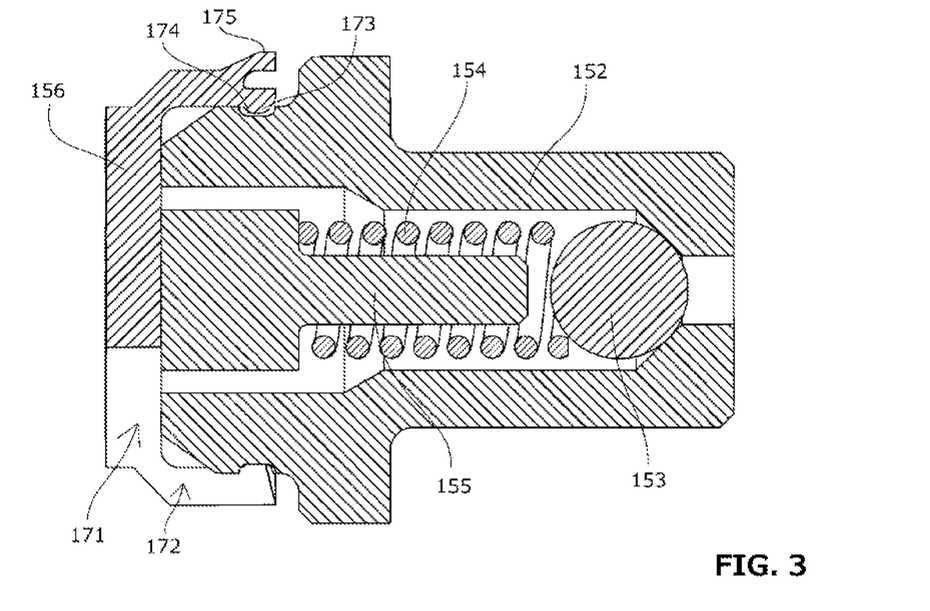
FIG. 3 is a cross-sectional view of a relief valve unit of the tensioner according to the first embodiment of the present invention.

The relief valve unit 151 includes, as shown in FIG. 2 and FIG. 3, a seat member 152, a valve ball 153 housed in the seat member 152, a spring 154 biasing the valve ball 153, a stopper member 155 holding the spring 154 and restricting the movement range of the valve ball 153, and a cap member 156 fitted with the seat member 152 to retain the stopper member 155 inside the seat member 152.

Figure 4:
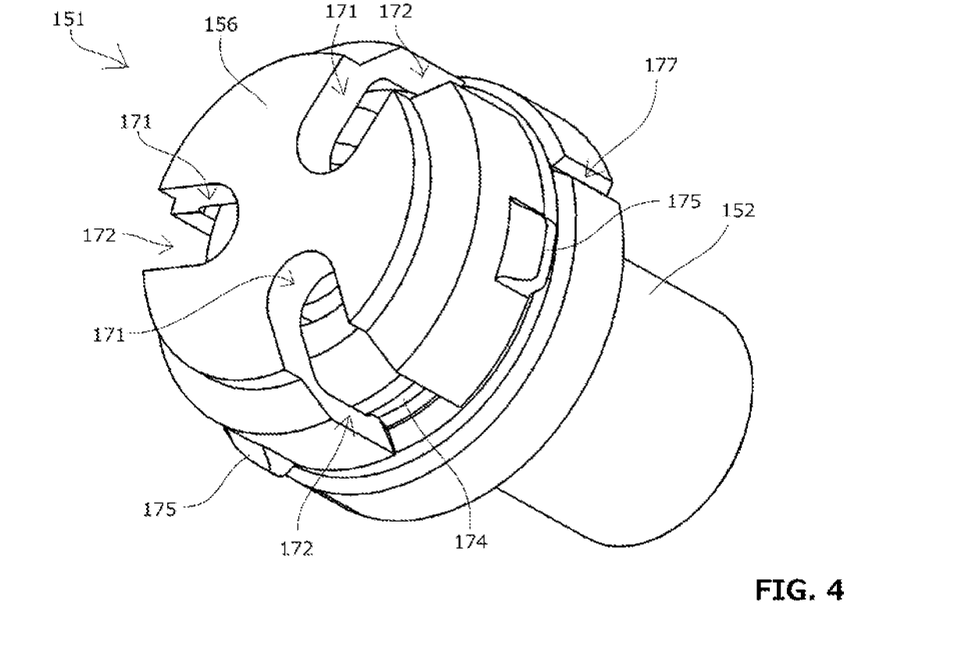
FIG. 4 is a perspective view of the relief valve unit of the tensioner according to the first embodiment of the present invention.

The cap member 156 has oil leak parts 171 as shown in FIG. 2 to FIG. 4 through which released oil is discharged to the relief-side space 126. In this embodiment, the oil leak part 171 has a lateral open part 172 for discharging the released oil directly in the radial direction.

The cap member 156 includes an engagement protrusion 173 to keep fitted with the seat member 152, while the seat member 152 has an engagement recess 174 that mates with the engagement protrusion 173 to keep the cap member 156 fitted with the seat member.

The cap member 156 has outer surface protrusions 175 that abut on the inner wall of the plunger hole 122 when housed in the plunger 120.

The outer surface protrusions 175 are formed in a shape that keeps the relief valve unit 151 inserted into the plunger hole 122 with a light press fit.

In this embodiment, part of the seat member 152 with a maximum diameter has a leak groove 177 configured to relieve the oil pressure inside the oil pressure chamber 111 by the orifice effect.

To assemble the tensioner 110 of this embodiment, the valve ball 153, spring 154, and stopper member 155 are set in the seat member 152, and the cap member 156 is fitted to the seat member 152. With the engagement protrusion 173 of the cap member 156 mated with the engagement recess 174 of the seat member 152, these components can be integrated as the relief valve unit 151 and handled together.

When the relief valve unit 151 is housed in the plunger 120, the outer surface protrusions 175 of the cap member 156 make contact with the inner wall of the plunger hole 122. With the outer surface protrusions 175 having a shape that allows the relief valve unit 151 to be held with a light press fit, the relief valve unit can be accommodated inside the plunger 120 with a light force, and does not come out easily.

By forming the cap member 156 from a resin, the pressure applied to the inner wall of the plunger hole 122 when pressing in the relief valve unit can be reduced further, so that the plunger 120 can be made thinner to be more lightweight.

During use of the tensioner 110 of this embodiment, when the pressure in the oil pressure chamber 111 exceeds a predetermined level, the valve ball 153 separates from the seat member 152 against the pressing force of the spring 154, thereby allowing the pressure to be relieved via the space around the stopper 155 inside the relief valve unit 151, oil leak parts 171 of the cap member 156, the relief-side space 126 in the plunger hole 122, and the external relief hole 123 of the plunger 120.

Since the oil leak parts 171 have lateral open parts 172 for discharging the released oil directly in the radial direction, the flow resistance of the path to the external relief hole 123 open in the outer circumferential surface is reduced, so that smooth pressure relief is possible.

Since there need be no space in the bottom part of the plunger hole 122 where the cap member 156 abuts on, the plunger 120 can have a smaller distal end plate thickness. The plunger 120 can then be made more lightweight, or have a longer spring space, or can have a shorter overall length.

Moreover, the plunger hole 122 can have a wider contact surface between its bottom part and the cap member 156, so that the cap member 156 can be made thinner and formed from resin and yet can withstand the large pressure from the main spring (main biasing means) 160.

Since the relief valve unit 151 is fixed with a light press fit inside the plunger with the circumferentially and intermittently provided outer surface protrusions 175, there is a clearance between the inner surface of the plunger hole 122 and the seat member 152. Moreover, with the leak groove 177, any residual air in the oil pressure chamber 111 can be quickly discharged through the external relief hole 123 after the start of oil supply.

Next, a tensioner according to a second embodiment of the present invention will be described with reference to the drawings.

Description of parts similar to those of the first embodiment will be omitted.

Figure 5:
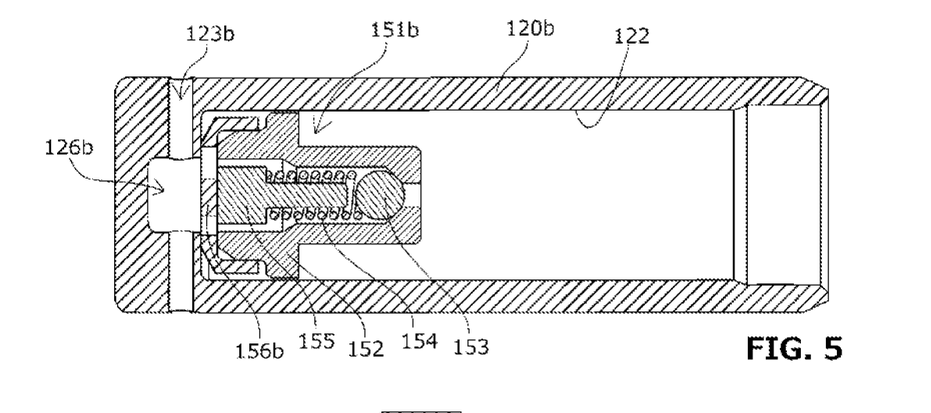
FIG. 5 is a cross-sectional view of a plunger of a tensioner according to a second embodiment of the present invention.

The plunger 120b of the tensioner according to the second embodiment includes a relief valve mechanism 150, as shown in FIG. 5, made up of a relief valve unit 151b inserted on the front side of the plunger hole 122, a relief-side space 126b formed as a recess at the bottom of the plunger hole 122, and an external relief hole 123b that causes the relief-side space 126b to communicate with the outside of the plunger 120b.

The external relief hole 123b opens radially in an outer circumferential surface of the plunger 120.

Figure 6:
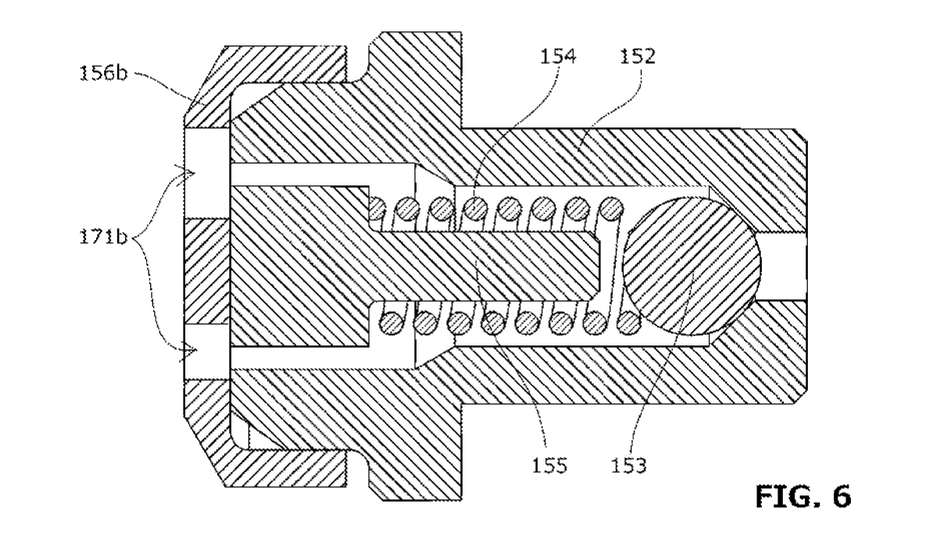
FIG. 6 is a cross-sectional view of the relief valve unit of the tensioner according to the second embodiment of the present invention.

The relief valve unit 151b includes, as shown in FIG. 5 and FIG. 6, a seat member 152, a valve ball 153 housed in the seat member 152, a spring 154 biasing the valve ball 153, a stopper member 155 holding the spring 154 and restricting the movement range of the valve ball 153, and a cap member 156b fitted with the seat member 152 to retain the stopper member 155 inside the seat member 152.

Figure 7:
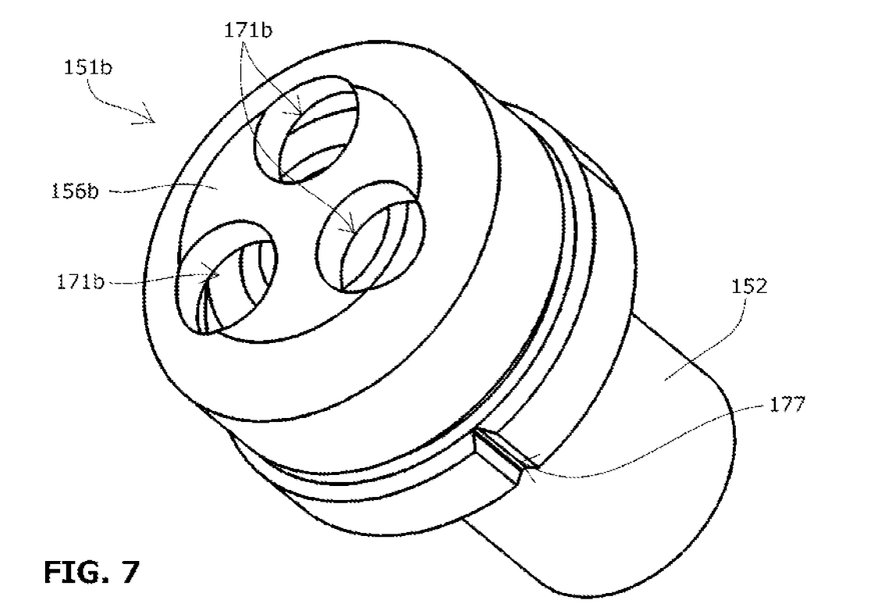
FIG. 7 is a perspective view of the relief valve unit of the tensioner according to the second embodiment of the present invention.

The cap member 156b includes oil leak parts 171b for discharging released oil to the relief-side space 126b, as shown in FIG. 5 to FIG. 7.

In this embodiment, the oil leak parts 171b are three holes provided on one side of the cap member 156b abutting the bottom of the plunger hole 122.

In this embodiment, part of the seat member 152 with a maximum diameter has a leak groove 177 configured to relieve the oil pressure inside the oil pressure chamber 111 by the orifice effect.

To assemble the tensioner 110 of this embodiment, the valve ball 153, spring 154, and stopper member 155 are set in the seat member 152, and the cap member 156b is fitted to the seat member 152. Thus these components can be integrated as the relief valve unit 151 and handled together.

By forming the seat member 152 from a resin, the pressure applied to the inner wall of the plunger hole 122 when pressing in the relief valve unit 151 into the plunger 120b can be reduced further, so that the plunger 120b can be made thinner to be more lightweight.

During use of the tensioner of this embodiment, when the pressure in the oil pressure chamber 111 exceeds a predetermined level, the valve ball 153 separates from the seat member 152 against the pressing force of the spring 154, thereby allowing the pressure to be relieved via the space around the stopper 155 inside the relief valve unit 151, oil leak parts 171b of the cap member 156b, the relief-side space 126b in the plunger hole 122, and the external relief hole 123b of the plunger 120.

Since the relief-side space 126b has a predetermined volume, the flow resistance of the path from the space around the stopper member 155 to the relief-side space 126b via the oil leak parts 171b is reduced, so that smooth pressure relief can be achieved.

Next, a variation example of the relief valve unit 151 of the tensioner 110 according to the first embodiment will be described.

Figure 8:
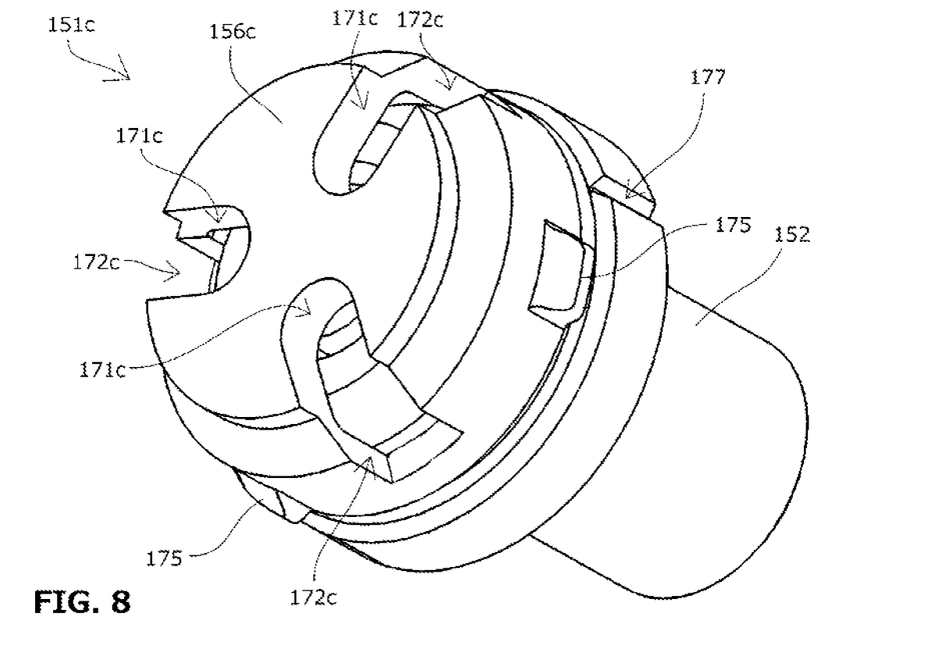
FIG. 8 is a perspective view of the relief valve unit of a first variation example of the tensioner according to the first embodiment of the present invention.

The relief valve unit 151c according to the first variation example has a cap member 156c with oil leak parts 171c having lateral open parts 172c for discharging the released oil directly in the radial direction, the lateral open parts having closed distal ends, as shown in FIG. 8.

This makes a tighter fit between the seat member 152 and the cap member 156c so that, even when the spring 154 has a large pressing force, the relief valve unit 151c, after being integrated, can be prevented from being disassembled during the assembly or due to vibration or shock during transport.

Figure 9:
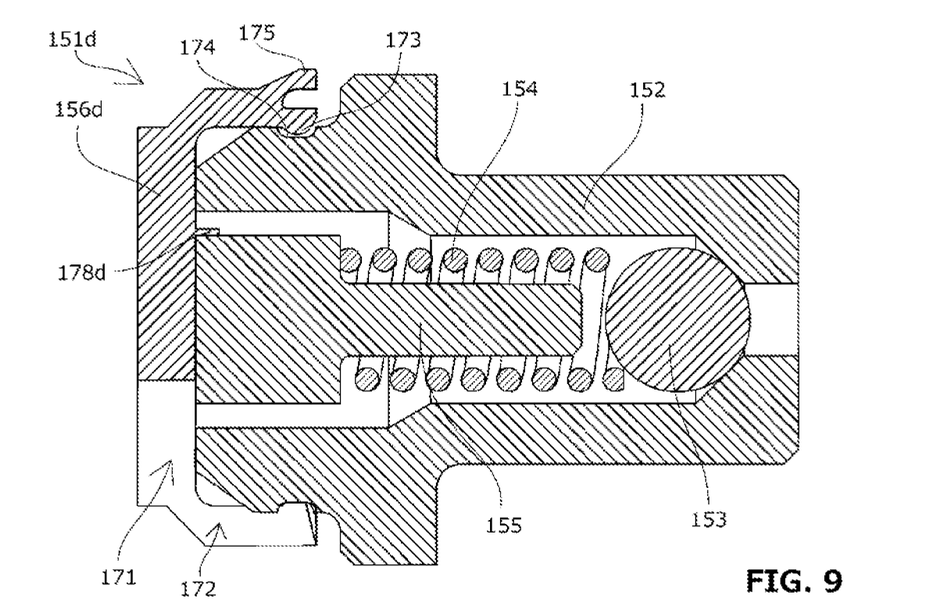
FIG. 9 is a cross-sectional view of the relief valve unit of a second variation example of the tensioner according to the first embodiment of the present invention.

The relief valve unit 151d according to a second variation example has a cap member 156d provided with a flange 178d on the surface that abuts on the stopper member 155, the flange forming a holding recess that fits with the stopper member 155, as shown in FIG. 9.

This makes assembly of the relief valve unit 151d even easier.

Alternatively, a holding recess that directly fits with the stopper member 155 can be provided on the surface of the cap member 156d that abuts on the stopper member 155, without forming the flange 178d.

Figure 10:
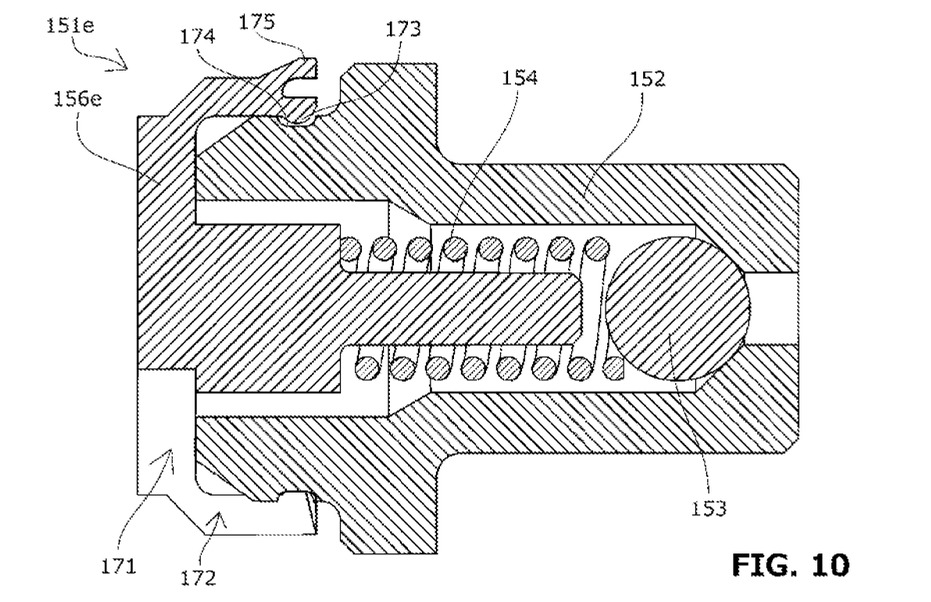
FIG. 10 is a cross-sectional view of the relief valve unit of a third variation example of the tensioner according to the first embodiment of the present invention.

The relief valve unit 151e according to a third variation example has a cap member 156e integrally formed with the stopper member, as shown in FIG. 10.

The cap member 156e can be produced easily from a resin. With a fewer number of components, the assembling of the relief valve unit 151e is made even easier.

Figure 11:
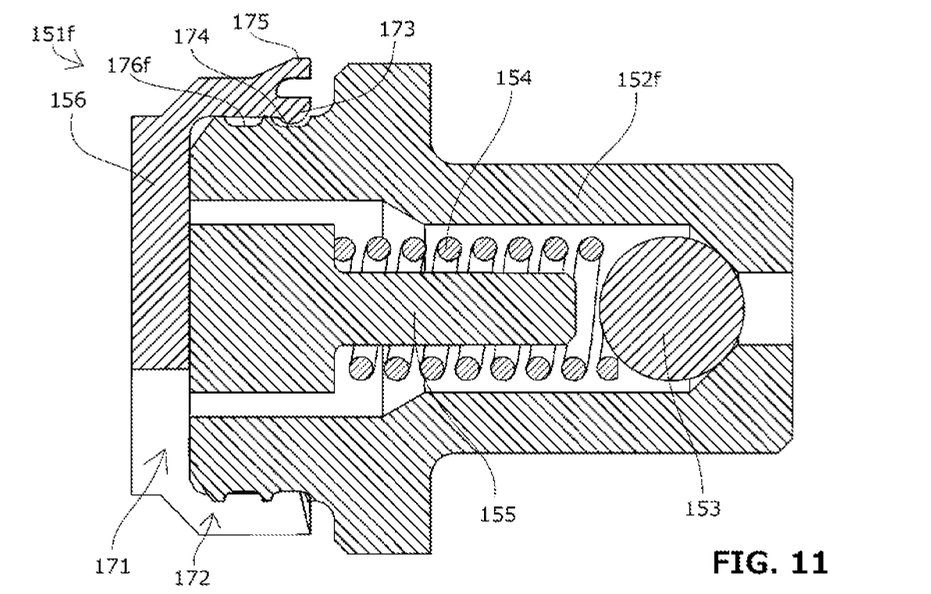
FIG. 11 is a cross-sectional view of the relief valve unit of a fourth variation example of the tensioner according to the first embodiment of the present invention.

The relief valve unit 151f according to a fourth variation example includes a seat member 152f that has an engagement recess 174 for keeping the cap member 156 fitted thereto by mating with the engagement protrusion 173 of the cap member 156, as shown in FIG. 11. In addition, as shown in FIG. 12, the seat member 152f is provided with a second engagement recess 176f that mates with the engagement protrusion 173 at a forward position in the direction in which the plunger protrudes.

Figure 12:
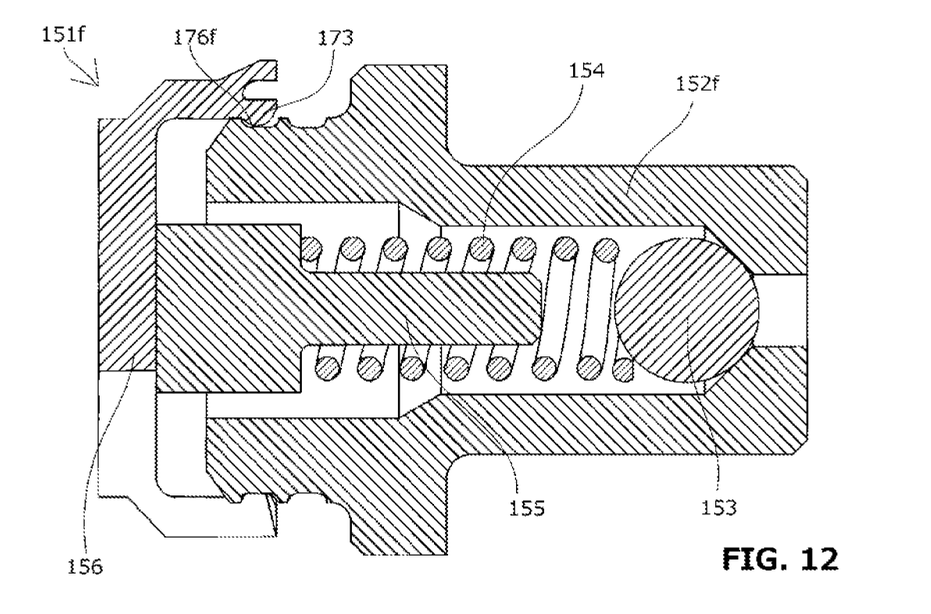
FIG. 12 is a cross-sectional view of the lightly press-fitted relief valve unit of the fourth variation example of the tensioner according to the first embodiment of the present invention.

Since the pressing force of the spring 154 is large, the tensioner 110 is assembled as follows: first, the relief valve unit 151f is temporarily put together, with the engagement protrusion 173 and the second engagement recess 176f mated with each other as shown in FIG. 12, and inserted into the plunger hole 122 of the plunger 120, after which it is pushed in further so that the engagement protrusion 173 and the engagement recess 174 engage each other. By completing the relief valve unit 151f to its proper form this way, assembling is made easier.

If the relief valve unit 151f includes the outer surface protrusion 175 formed in a shape that keeps the unit with a light press fit inside the plunger hole 122, the second engagement recess 176f may have a larger depth than the engagement recess 174. This way, when the relief valve unit 151f is inserted into the plunger hole 122, it can be smoothly pushed in deep, as the outer diameter of the cap member 156 is made smaller. When the relief valve unit is further pushed in to make the engagement protrusion 173 and the engagement recess 174 engage each other, the outer diameter of the cap member 156 is made larger so that the unit can be maintained with a light press fit inside the plunger hole 122.

Figure 13:
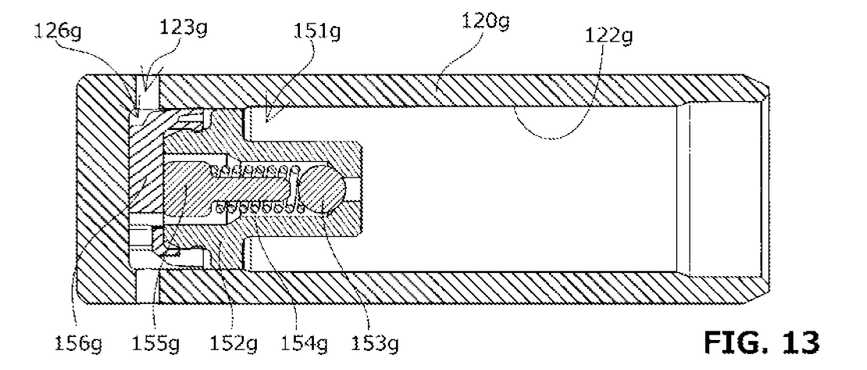
FIG. 13 is a cross-sectional view of a plunger of a tensioner according to a third embodiment of the present invention.

The plunger 120g of the tensioner 110g according to a third embodiment includes a relief valve mechanism, as shown in FIG. 13, made up of a relief valve unit 151g inserted on the front side of the plunger hole 122g, and an external relief hole 123g that causes a relief-side space 126g of the relief valve unit 151g to communicate with the outside of the plunger 120g.

The external relief hole 123g opens radially in an outer circumferential surface of the plunger 120g.

Figure 14:
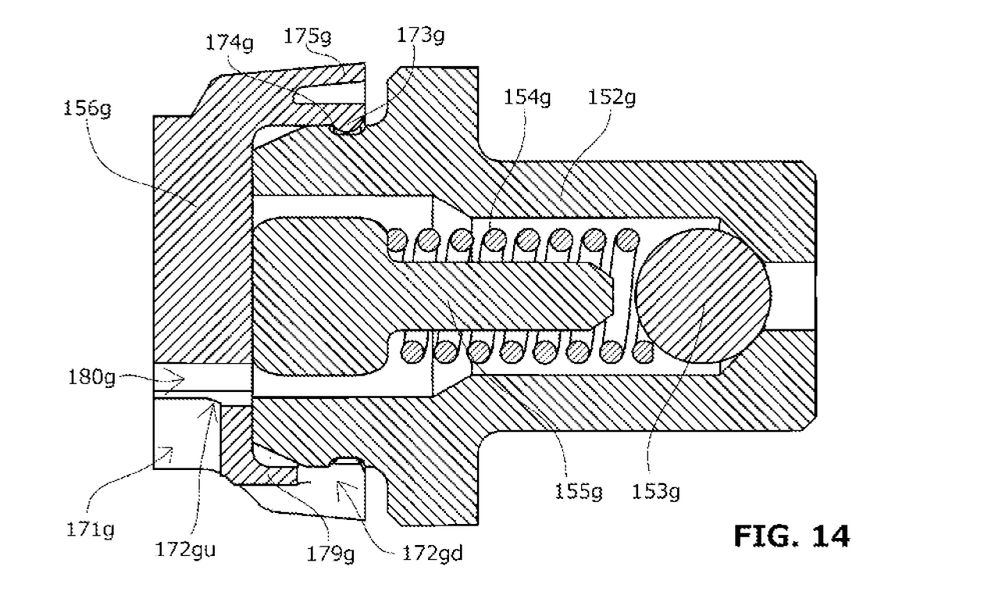
FIG. 14 is a cross-sectional view of a relief valve unit of the tensioner according to the third embodiment of the present invention.
Figure 15:
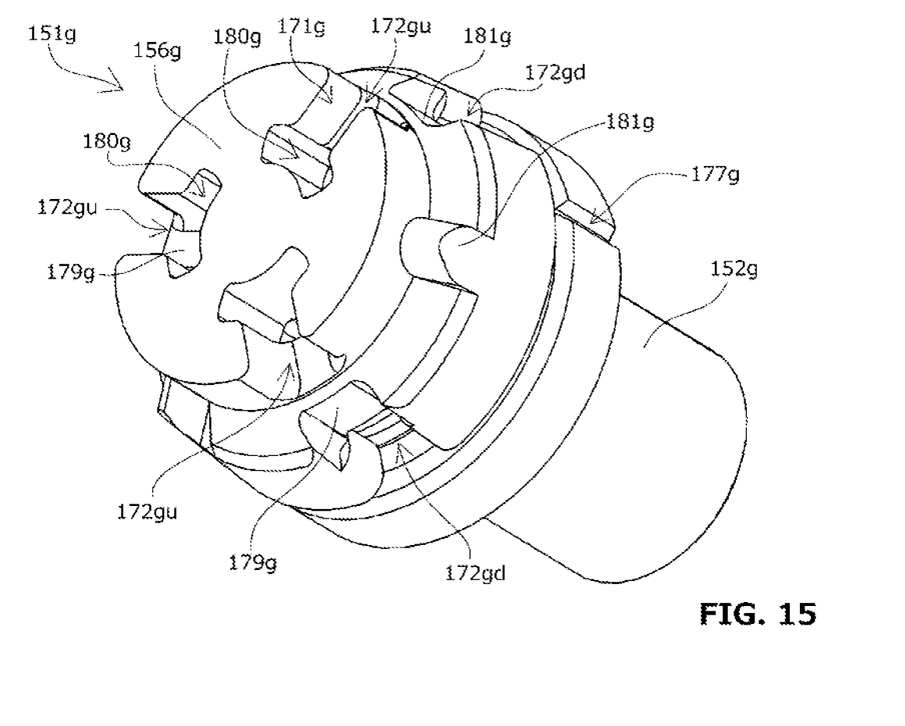
FIG. 15 is a perspective view of the relief valve unit of the tensioner according to the third embodiment of the present invention.

The relief valve unit 151g includes, as shown in FIG. 13 to FIG. 15, a seat member 152g, a valve ball 153g housed in the seat member 152g, a spring 154g biasing the valve ball 153g, a stopper member 155g holding the spring 154g and restricting the movement range of the valve ball 153g, and a cap member 156g fitted with the seat member 152g to retain the stopper member 155g inside the seat member 152g.

The cap member 156g includes oil leak parts 171g for discharging released oil to the relief-side space 126g, as shown in FIG. 13 to FIG. 16. In this embodiment, the oil leak parts 171g further have a top open part 180g for discharging the released oil in the top direction, and a lateral open part (172gu and 172gd) for discharging the released oil in the radial direction.

Figure 16:
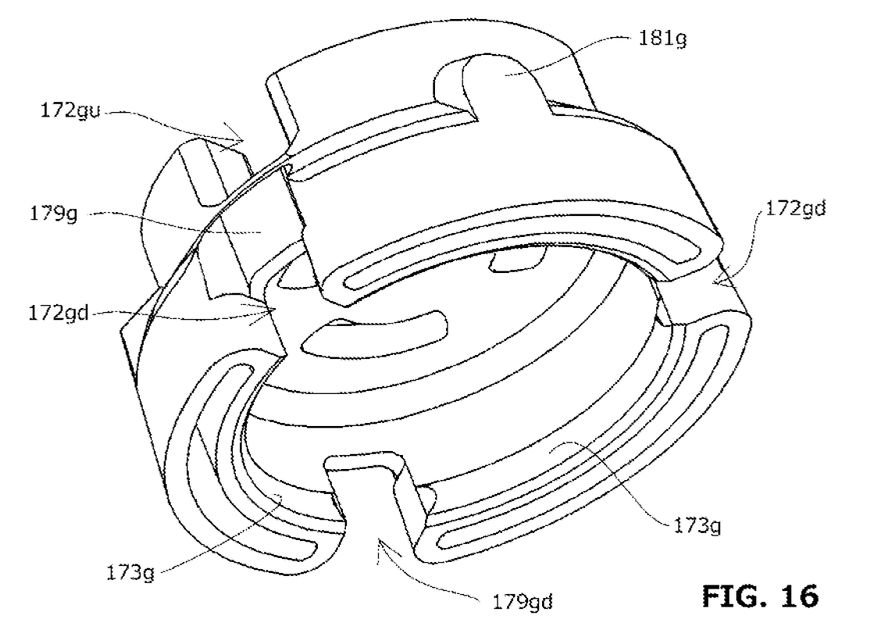
FIG. 16 is a perspective view of a cap member in the relief valve unit of the tensioner according to the third embodiment of the present invention.

The lateral open part (172gu and 172gd) has a connected portion 179g circumferentially transecting in a middle part thereof, whereby it is divided into a top-side lateral open part 172gu and an open-side lateral open part 172gd.

The top-side lateral opera part 172gu mainly serves to discharge the released oil in the radial direction, while the open-side lateral open part 172gd mainly functions as a slit for allowing deflection of the cap member 156g when the cap member is fitted with the seat member 152g.

The cap member 156g includes an engagement protrusion 173g to keep fitted with the seat member 152g, while the seat member 152g has an engagement recess 174g that mates with the engagement protrusion 173g to keep the cap member 156g fitted with the seat member.

As the cap member 156g has the connected portion 179g, a large force is required to deform the open-side lateral open part 172gd that functions as a slit for allowing deflection. Therefore, the retention force when the cap member is fitted with the seat member 152g can be enhanced, so that the cap member 156g can be prevented from coming off when subjected to a large impact.

In this embodiment, the cap member 156g is provided with oil leak parts 171g at three circumferential locations, with flow adjusting protrusions 181g between the oil leak parts 171g.

This controls the flow of released oil in the outer circumferential direction of the cap member 156g, prevents turbulence, and enables smooth oil leak, as well as improves the guiding feature when the relief valve unit 151g is inserted into the plunger 120g, which facilitates assembly.

In this embodiment, part of the seat member 152g with a maximum diameter has a leak groove 177g configured to relieve the oil pressure inside the oil pressure chamber by the orifice effect.

The top open part 180g of the oil leak part 171g is formed wider than the circumferential width of a portion of the lateral open part 172gu on the top side above the connected portion 179g.

This allows the top open part 180g to be positioned on radially outer side, which ensures there is a sufficient flow path area for the released oil flowing toward the top side to enable smooth oil escape, as well as allows the top open part 180g to have an optimal hole shape that provides a sufficient pressure-receiving area for receiving the stopper member 155g pressed by the spring 154g.

Figure 17:
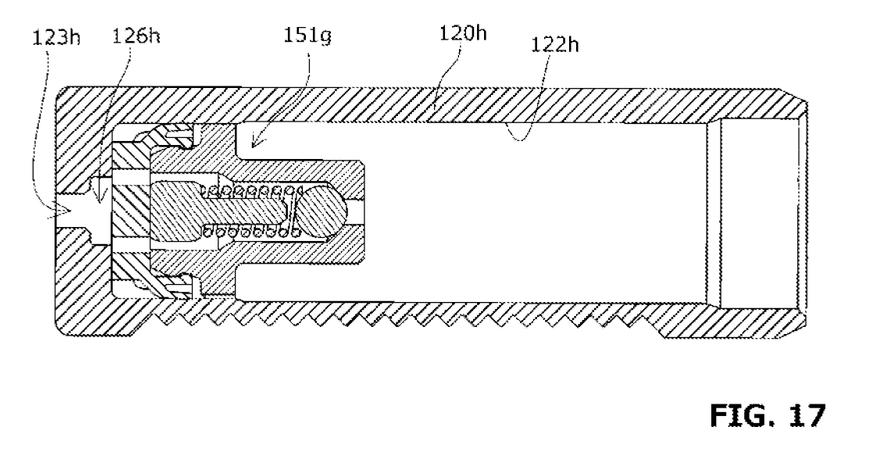
FIG. 17 is a cross-sectional view of a plunger in a variation example of the tensioner according to the third embodiment of the present invention.

Since the relief valve unit 151g of this embodiment can guarantee a sufficient amount of oil released from the top side thanks to the shape of the top open parts 180g, it can be used in a plunger 120h that has an external relief hole 123h at the top, for example, as in the variation example shown in FIG. 17.

While embodiments of the present invention have been described above in detail, the present invention is not limited to these embodiments and may be carried out with various design changes without departing from the scope of the present invention set forth in the claims.

For example, while the tensioner 110 was described as a component to be incorporated in a timing system of a car engine in the embodiments above, the purpose of use of the tensioner 110 is not limited to this specific application.

Also, while the tensioner 110 was described as a component that applies tension to a drive chain CH with a tensioner lever G in the embodiments above, the plunger 120 can directly guide the drive chain CH slidably with a distal end thereof to apply tension to the drive chain CH.

The tensioner may not necessarily be applied to a transmission mechanism with a drive chain CH but can also be used for similar transmission mechanisms that use belts, ropes and the like, and can be applied in a variety of industrial fields where it is required to apply tension to an elongated component.

While the housing 130 accommodating the plunger 120 is described as the component known as a tensioner body that is attached to an engine block or the like in the embodiment described above, the housing 130 is not limited to the specific form described above and may be a cylindrical component known as a sleeve inserted into a body hole formed in the tensioner body.

The invention claimed is:

1. A tensioner comprising:
a plunger having a plunger hole that is open on a rear side;
a housing having a plunger bore that is open on a front side and accommodates the plunger;
main biasing means that is accommodated inside an oil pressure chamber formed between the plunger and the plunger bore such as to freely expand and contract, and that biases the plunger toward the front side; and
a relief valve mechanism that releases oil inside the oil pressure chamber out of the plunger when oil pressure in the oil pressure chamber rises,
the relief valve mechanism including a relief valve unit inserted into the plunger hole on a front side thereof, and an external relief hole that causes a relief-side space of the relief valve unit in the plunger hole to communicate with outside of the plunger, the relief valve unit including a seat member, a valve ball housed in the seat member, a spring biasing the valve ball, a stopper member holding the spring and restricting a movement range of the valve ball, and a cap member fitted with the seat member and retaining the stopper member inside the seat member,
the cap member having an oil leak part that discharges released oil to the relief-side space, and
the external relief hole being opened radially in an outer circumferential surface of the plunger.
wherein the oil leak part includes a lateral open part that discharges released oil directly in a radial direction.

2. The tensioner according to claim 1, wherein the oil leak part includes a connected portion circumferentially transecting in a middle part of the lateral open part.

3. The tensioner according to claim 1, wherein the oil leak part includes a top open part that is open on the front side, and
the top open part is formed wider in a circumferential direction than a portion of the lateral open part above the connected portion.

4. The tensioner according to claim 1, wherein the cap member includes a plurality of the oil leak parts, and a flow adjusting protrusion provided on an outer circumferential surface between the oil leak parts.

5. The tensioner according to claim 1, wherein the cap member includes an engagement protrusion that keeps the cap member fitted with the seat member, and
the seat member including an engagement recess that mates with the engagement protrusion to keep the cap member fitted with the seat member.

6. The tensioner according to claim 5, wherein the engagement recess is provided at a plurality of positions along a direction in which the plunger moves out, such as to be able to hold the cap member.

7. The tensioner according to claim 1, wherein the cap member includes an outer surface protrusion that abuts on an inner wall of the plunger hole when housed inside the plunger.

8. The tensioner according to claim 7, wherein the outer surface protrusion of the cap member is formed in a shape that keeps the relief valve unit with a light press fit when the relief valve unit is inserted into the plunger hole.

9. The tensioner according to claim 1, wherein the cap member includes a holding recess that fits with the stopper member.

10. The tensioner according to claim 1, wherein the cap member is integrally formed with the stopper member as a single member.

11. The tensioner according to claim 1, wherein the cap member is made of a resin material.

* * * * *